United States Patent Office 3,451,978
Patented June 24, 1969

3,451,978
VINYLIDENE FLUORIDE INTERPOLYMERS
John R. Chalmers, Wallingford, Pa., and Frederic B. Stilmar, Wilmington, Del., assignors to E. I. du Pont de Nemours and Company, Wilmington, Del., a corporation of Delaware
No Drawing. Filed Mar. 1, 1966, Ser. No. 530,799
Int. Cl. C08f 15/40
U.S. Cl. 260—78.5    21 Claims

ABSTRACT OF THE DISCLOSURE

Normally solid interpolymers of
(a) Vinyl fluoride or vinylidene fluoride or mixtures thereof,
(b) About 0.05 to about 1.5 moles, per mole of (a) of tetrafluoroethylene, and
(c) About 0.01 to about 0.7 mole, per mole of (a) of at least one monovinyl ester of an aromatic carboxylic acid derived from benzene or naphthalene.

---

The present invention is directed to novel interpolymers of a hydrofluorovinyl monomer, tetrafluoroethylene, and certain vinyl aromatic carboxylates.

The novel interpolymers of this invention are useful for molding, fiber and self-supporting film applications and are particularly useful as easily applied, weatherable, protective coatings for a variety of substrates.

Homopolymers and certain copolymers of fluorinated olefins are commercially available and extensively described in the prior art. Such fluorinated olefin polymers, for example, polytetrafluoroethylene, are useful in a variety of applications due to their unique combination of physical and chemical properties. Chemically, such polymers offer excellent resistance to corrosive chemicals. Physically, these polymers possess good thermal stability, excellent dielectric properties, and unusual antistick characteristics. However, although the commercial highly fluorinated olefin polymers do possess these unusual properties, their chemical and physical characteristics are such that the polymers do not provide the balance of properties necessary to give useful, easily applied, protective coating compositions.

The properties of polymers of highly fluorinated olefins can be altered to give more useful coating compositions by incorporating a variety of comonomers such as ethylene, propylene, isobutylene, chlorotrifluoroethylene, vinyl methyl ether, and vinyl chloride. However, such modified dipolymers, which have been disclosed in the art, do not possess the desired balance of properties to make them useful as easily applied surface coating compositions. In order to be a superior film-forming coating composition, the polymer must have the following characteristics:

(a) The polymer must be soluble in an inexpensive organic solvent.
(b) Films of the polymer should be sufficiently flexible to be resistant to impact.
(c) The polymer should be coalescible at temperature from about 50° F. to about 80° F. to form continuous, tough films.
(d) The polymer should have good pigment binding and dispersing capacity.

None of the fluorine-containing polymers commercially available or described in the art have these enumerated characteristics in the proper balance to enable their use as superior protective coatings to a wide variety of substrates which are readily applied at ambient temperatures.

The interpolymers of the present invention are unique as film-forming materials for preparing protective coatings. Unlike other fluorine-containing vinyl interpolymers, the interpolymers of the present invention are characterized by their high degree of solubility in inexpensive organic solvents without undue sacrifice of hardness and by the ease by which coatings are coalesced from these polymers at room temperature.

More specifically, the polymers of the present invention possessing the balance of properties required for protective coatings are normally solid interpolymers comprising (A) as a hydrofluorovinyl monomer vinyl fluoride, vinylidene fluoride or mixtures thereof,
(B) from about 0.05 to 1.5 moles, per mole of hydrofluorovinyl monomer, of tetrafluoroethylene, and
(C) from about 0.01 to about 0.7 mole, per mole of hydrofluorovinyl monomer, of at least one monovinyl ester of an aromatic carboxylic acid, the aromatic group being derived from benzene, naphthalene or ring-substituted derivatives thereof.

Optionally, the polymers may contain, in addition to the three essential monomers described above, (1) From about 0.05 to 0.7 mole, per mole of hydrofluorovinyl monomer, of at least one polymerizable monounsatuarted monomer chosen from (a) $C_2$ to $C_3$ halohydrocarbon olefins other than vinyl fluoride, vinylidene fluoride, and tetrafluoroethylene,
(b) vinyl esters of 2 to 18 carbon alkane carboxylic acids,
(c) $C_2$ to $C_8$ hydrocarbon olefins containing the group $CH_2=C<$, and
(d) alkyl vinyl ethers, said alkyl being of one to 16 carbons;

(2) From about 0.001 to about 0.1 mole, per mole of hydrofluorovinyl monomer, of at least one plymerizable monoolefinically unsaturated acid of acidity constant ($pK_a$) of from 1.0 to 5.5 or derivatives convertible thereto.

The polymers of the present invention also comprise interpolymers where, in addition to the three essential components (A), (B), and (C) hereinbefore described, both optional components (1) and (2) are present.

The polymer products of this invention consist of at least three essential components. These essential components are:

(1) a hydrofluorovinyl monomer selected from vinyl fluoride, vinylidene fluoride, or mixtures thereof,
(2) tetrafluoroethylene, and
(3) at least one vinyl aromatic carboxylate.

The interpolymers contain these components in the proportions of from 20 to 85 parts by weight of the hydrofluorovinyl monomer, i.e., vinyl fluoride, vinylidene fluoride or mixtures thereof, from 5 to about 50 parts by weight of tetrafluoroethylene, and from about 1 to about 35 parts by weight of the monovinyl ester of an aromatic carboxylic acid. When mixtures of vinyl fluoride and vinylidene fluoride are employed, the particular ratio of these two monomers is dependent on the properties desired in the interpolymer. Any ratio of these two fluoro-olefins may be used; however, when harder polymers are desired or interpolymers containing higher amounts of the vinyl aromatic carboxylate are desired, it is desirable to use larger amounts of vinyl fluoride. Equal amounts of vinyl fluoride and vinylidene fluoride are usually preferred.

Copolymers consisting only of vinylidene fluoride and tetrafluoroethylene within the composition limits of this invention are not highly soluble in common organic solvents and yield poorly coalesced, cloudy, somewhat brittle solution-cast films unless baked. Copolymers consisting only of tetrafluoroethylene and a vinyl aromatic carboxylate, such as tetrafluoroethylene/vinyl benzoate copolymers, are brittle and considerably less soluble in organic solvents than the polymers of the present invention. Vinyl aromatic carboxylates inhibit the polymerization of vinylidene fluoride and, therefore, two-component vinylidene fluoride/vinyl aromatic carboxylate copolymers are not readily prepared. Even when the amount of vinyl aromatic carboxylate is minimized, the copolymerization proceeds poorly. For example, the copolymerization of vinylidene fluoride and vinyl benzoate in the ratio of 120/2 by weight gives very poor results. When larger amounts of vinyl benzoate relative to the vinylidene fluoride are employed, the copolymer yield is even less. However, when tetrafluoroethylene is added as a third monomer, copolymerization proceeds well. Similarly, the free radical initiated copolymerization of vinyl fluoride and vinyl aromatic carboxylates gives only low yields of copolymer. Addition of tetrafluoroethylene as a third monomer makes possible good yields of readily soluble terpolymer which form well-coalesced solution-cast films at room temperature. Mixtures of vinyl fluoride and tetrafluoroethylene within the composition limits of the invention polymers copolymerize well but the resulting copolymers are not appreciably soluble at room temperature and cannot be solution-cast to form well-coalesced films at room temperature.

The incorporation of both vinyl fluoride and vinylidene fluoride along with tetrafluoroethylene and the vinyl alkane carboxylate in the interpolymer results in the best-all-around balance of properties for use as a coating composition. These four-component polymers are a preferred interpolymer of the present invention.

The presence of the vinyl aromatic carboxylate is necessary to give soluble polymers which are coalescible at room temperature. A three-component interpolymer, vinyl fluoride, vinylidene fluoride, and tetrafluoroethylene (in the ratio 70/70/35), although soluble in hot dimethylacetamide, gives a powdery, noncoalesced coating when cast from the dimethylacetamide solution.

The vinyl esters of aromatic carboxylic acids useful in the present invention have the structure $CH_2=CHO_2CAR$. AR in the structural formula represents a $C_6$ to $C_{16}$ carbocyclic aromatic group derived from benzene or naphthalene. The benzene or naphthalene groups may be free of substituents other than hydrogen, such as in vinyl benzoate or vinyl naphtholate, or may carry one or more substituents attached to the benzene or naphthalene ring.

These substituents, however, must not interfere with free radical polymerizations. Typical examples of non-interferring substituents are carboxyl, carboalkoxyl, acyl, including benzoyl, cyano, halo, including fluorine, chlorine, and bromine, phenyl, trifluoromethyl, hydroxyl, alkoxyl, alkyl, aryloxy, acyloxy, thioether, and the phosphonic and sulfonic acid groups. Groups which are known to interfere with free radical polymerization and thus must not be substituted on the aromatic nucleus are the aldehyde group, the amino group, the nitroso group, and the nitro group.

The preferred vinyl aromatic carboxylate is vinyl benzoate. Of the substituted vinyl benzoates, the vinyl chlorobenzoates are particularly useful. Vinyl esters of aromatic acids containing three or more fused benzene rings are not useful in the polymers of the present invention because they are either not readily copolymerizable to interpolymers or yield products which are too high melting and intractable to meet the requirements for protective coating compositions.

Typical examples of useful vinyl aromatic carboxylates are the vinyl esters of the following acids: benzoic, naphthoic, chlorobenzoic, bromobenzoic, fluorobenzoic, chloronaphthoic, bromonaphthoic, fluoronaphthoic, dichlorobenzoic, dibromobenzoic, difluorobenzoic, dichloronaphthoic, carboalkoxylbenzoic (monoalkyl ester of phthalic, isophthalic or terephthalic acids), acetylbenzoic, carboalkoxylchlorobenzoic (e.g., monoalkyl ester of chlorophthalic acid), cyanobenzoic, chlorocyanobenzoic, bromocyanobenzoic, phenylbenzoic, chlorophenylbenzoic, fluorophenylbenzoic, phenylchlorobenzoic, trifluoromethylbenzoic, trifluoromethylnaphthoic, carboalkoxyphenylbenzoic, chloromethylbenzoic, cyanomethylbenzoic, carboalkoxynaphthoic (i.e., monoalkyl ester of naphthalic acid), and acetylnaphthoic acid, salicylic, chlorosalicylic, methoxybenzoic, anisic, toluic, tert.-butylbenzoic, phenoxybenzoic, methylthiobenzoic, acetyl salicylic, hydroxynaphthoic, chlorohydroxynaphthoic, and methoxynaphthoic acids, and the monovinyl esters of the following dicarboxylic acids: phthalic, isophthalic, terephthalic, diphenic, and naphthalic acids.

In certain cases, and particularly where much higher solubility in organic solvents is desired while retaining other basic properties of the polymer compositions of this invention, it is permissible and perferable to copolymerize vinyl fluoride and/or vinylidene fluoride, tetrafluoroethylene and the vinyl aromatic carboxylate with certain other polymerizable olefinic materials. Such olefinic materials include (a) The halogenated olefins (including the fully halogenated as well as the partly halogenated-partly hydrocarbon olefins) containing from 2 to 3 carbon atoms such as the chloroolefins of 2 to 3 carbon atoms, the fluoroolefins of 2 to 3 carbon atoms, other than vinyl fluoride, vinylidene fluoride, and tetrafluoroethylene, and the chlorofluoroolefins of 2 to 3 carbon atoms, (b) The vinyl esters of alkane carboxylic acids of 2 to 18 carbons, (c) Hydrocarbon olefins of 2 to 8 carbon atoms containing the group $CH_2=C<$, and (d) Alkyl vinyl ethers wherein the alkyl group contains 1 to 16 carbons.

Representative examples of the optional halogenated olefins are vinyl chloride, vinylidene chloride, 1,2-dichloroethylene, trifluoroethylene, 1,2-difluoroethylene, dichlorodifluoroethylene (both isomers), chlorofluoroethylene (both isomers), dichlorodifluoropropylene, and the various isomeric forms of trichlorotrifluoropropylene, tetrafluorodichloropropylene, chloropentafluoropropylene, hexafluoropropylene, dichlorotrifluoropropylene, chlorotetrafluoropropylene, pentafluoropropylene, chlorotrifluoropropylene, trifluoropropylene, chlorodifluoropropylene, and tetrafluoropropylene. Of these, trifluoroethylene and chlorotrifluoroethylene are preferred.

Representative examples of the optional vinyl esters of alkanecarboxylates are the vinyl esters of the fatty acid series from acetic to stearic acids, vinyl butyrate being preferred, and the vinyl esters $$CH_2=CHO_2CC(CH_3)_2(CH_2)_nCH_3$$

where $n$ is 0 to 9, e.g., $CH_2=CHO_2CC(CH_3)_2(CH_2)_8CH_3$.

The aliphatic hydrocarbons having only one terminal ethylenically unsaturated group, i.e., hydrocarbon olefins, which are useful in this invention have the structure $CH_2=CR_2$ where each R may be hydrogen or an alkyl group, or together the two R's may be joined to form a cycloaliphatic group. The olefins which may be utilized as a component of the novel polymers of this invention contains from 2 to 8 carbon atoms and include such monomers as ethylene, propylene, 1-butene, 1-pentene, 1-hexene, 1-heptene, 1-octene, isobutylene, isopentene, methylenecyclohexane, methylenenorbornylene (only the exocyclic double bond is polymerizable), and various olefins containing branched chain alkyl groups such as 4-methyl-1-pentene, and 3,3-dimethyl-1-butene. These olefins are all characterized by having only one terminally ethylenically unsaturated group $CH_2=C<$. They are all free of aromatic groups, as styrene and similar compounds are not useful in this invention.

Representative examples of the optional alkyl vinyl ethers are methyl vinyl ether, ethyl vinyl ether, propyl vinyl ether, isopropyl vinyl ether, isobutyl vinyl ether, hexyl vinyl ether, perfluoromethyl perfluorovinyl ether, 1-trifluoromethyl-2,2,2-trifluoroethyl vinyl ether, n-butyl perfluorovinyl ether, cetyl vinyl ether, lauryl vinyl ether, octyl vinyl ether, 2,2,2-trifluoroethyl perfluorovinyl ether, 1,1,2-trifluoro-2-chloroethyl vinyl ether, 2-ethoxypentafluoropropylene, and ethyl trifluorovinyl ether. Of these, the fluorinated alkyl vinyl ethers are preferred.

When an optional monomer from the above group is polymerized with the three essential monomer components of the invention polymers, increased ease in paint formulation is generally detected.

In cases where high durability on metals is particularly desirable, it is useful to include in the polymerization mixture of vinyl fluoride and/or vinylidene fluoride, tetrafluoroethylene, and vinyl aromatic carboxylate monomers from about 0.001 to about 0.1 mole, per mole of vinyl fluoride and/or vinylidene fluoride, of an olefinically unsaturated polymerizable acid having an acidity constant ($pK_a$) of from 1.0 to 5.5. More particularly, such acid monomers are chosen from the following:
(A) the mono- and dicarboxylic acids of from 3 to 18 carbon atoms,
(B) the mono- and diesters, haloesters, the salts, and the anhydrides of such carboxylic acids,
(C) the phosphonic acids of from 3 to 18 carbon atoms, and
(D) the mono- and diesters, haloesters, salts, and anhydrides of such phosphonic acids.

It is preferred to use from about 0.005 to about 0.05 mole of such acid monomers per mole of hydrofluorovinyl monomer. Useful monomeric materials falling within this group include unsaturated carboxylic acids of from 3 to 18 carbon atoms such as acrylic acid, methacrylic acid, α-chloroacrylic acid, crotonic acid, vinylacetic acid, allylacetic acid, 10-undecylenic acid, 3-methylenecyclobutane carboxylic acid, oleic acid, maleic acid, fumaric acid, itaconic acid, and unsaturated phosphonic acids having up to 18 carbon atoms such as vinylphosphonic acid, allylphosphonic acid, 17-octadecenephosphonic acid, and 2-phosphonylmethylpropene - 3 - phosphonic acid. Useful lower alkyl esters of the above acids include the various isomeric methyl, ethyl, propyl, butyl, amyl, and hexyl mono- and diesters. The esters of maleic and fumaric acid are particularly preferred as the optional component in the polymers of this invention because they improve the application properties of the polymer in addition to giving the polymer high durability on metals. Useful examples of the maleic and fumaric acid esters are the dimethyl, diethyl, dipropyl, dibutyl, diamyl, and dihexyl esters. Dibutyl esters of maleic acid are preferred where high solubility and high durability on metals are desired. For simple high durability on metal, the neopentyl and tert.-butyl esters are the preferred alkyl esters and 2-chloroethyl esters are the preferred haloalkyl esters. Because of their hygroscopic nature, the phosphonic acid monomers are preferably used as esters. Polymerizable anhydrides, such as maleic anhydride, itaconic anhydride, and the anhydride of the monoethyl ester of vinylphosphonic acid, may also be used. The sodium and potassium salts of the above acids are also very useful, such as disodium vinylphosphonate and sodium acrylate. Bis(2-chloroethyl)vinylphosphonate and itaconic acid are the preferred optional unsaturated acid monomers.

Inert materials such as dyes, pigments, or antioxidants may be incorporated into the polymers of this invention either by being included in the polymerization mixture or preferably by being mixed with the preformed polymers by means well known in the art such as sand milling or ball milling. When pigmented polymers are desired, usually from 20 to 60 parts of finely divided pigments per 100 parts of polymer are incorporated in the preformed polymers by sand or ball milling. Pigments such as titanium dioxide and copper phthalocyanine work well in the polymer coatings of this invention. As the polymers of this invention are essentially transparent to ultraviolet light, absorbers of ultraviolet light may also be incorporated into the polymers if the substrate being treated is itself sensitive to ultraviolet light, as in the case of most woods.

The polymers of the present invention may be applied as protective coatings on a number of different types of substrates which include ferrous metals such as iron and steel, ferrous alloys such as stainless steel, nonferrous metals such as aluminum, zinc, copper, and the like, and alloys thereof, wood of all types, including hardboard, cellulose products such as paper, and other construction materials such as concrete, plastics, brick, asphalt, etc. The polymer coatings may be applied to metals directly or may be applied over metals which have been surface treated with anticorrosion precoatings such as in the case of an anodized surface on aluminum. Over porous surfaces, such as wood, it is often desirable to apply a primer coating to the surface followed by a coating of the polymers of this invention over the primer. The preferred method of application involves dissolving the polymers in a common organic solvent such as cyclohexanone, methyl ethyl ketone, dimethylacetamide, tetrahydrofuran, nitroethane or mixed solvents such as xylene/nitroethane/ethyl acetate or nitroethane/toluene, and then applying the solutions to the surface. Evaporation of the solvent leaves a continuous coalesced film which is durable and weather resistant. Other application techniques such as melt extrusion, melt coating, or flame spraying may be used. The solvent method is preferred, however, because of the excellent solubility of the invention polymers in a variety of common solvents.

The coating thickness on the substrate is variable at will and is adjusted by the control of the concentration of polymer in the solution and the amount of solution applied. Coatings of 1 to 2 mil thickness have been found particularly suitable as protective coatings for most substrates.

Unsupported films of the polymers of this invention find use as ultraviolet light permeable films for green houses and like situations where transmission of ultraviolet light is desirable. These films may also be applied to many substrates using lamination techniques.

The polymers of the present invention are medium to high molecular weight materials having molecular weights in excess of 3,000 with upper limits of about 500,000. It has been found, however, that inherent viscosity is a far more useful characteristic of the present polymers than molecular weight since their usefulness as coating materials is directly related to their inherent viscosities without reference to molecular weight. The polymers of this invention have inherent viscosities between 0.1 and 3.0 as 0.5% solutions by weight in dimethylformamide at 30° C. The polymers of this invention having inherent viscosities of 0.2 to 1.0 are preferred. The inherent viscosity is derived from the equation $$n_i = \frac{1}{c} \ln [n/n_0]$$

wherein $n_i$ is the inherent viscosity, $n$ is the measured viscosity of the 0.5% solution in dimethylformamide, $n_0$ is the measured viscosity of pure dimethylformamide, ln is the natural logarithm, and $c$ is the concentration of polymer in grams/100 ml. of solution. The method of measurement used herein was the capillary or Ostwald method. For further details on viscosity measurements, see Weissberger, "Techniques of Organic Chemistry," vol. 1, Part 1, third edition, pp. 689 et seq.

The preferred compositions of the present invention for use as clear coatings on metal such as aluminum or on wood are pentapolymers of vinyl fluoride, vinylidene fluoride, tetrafluoroethylene, vinyl benzoate, and itaconic acid. The preferred compositions for use in pigmented coatings on wood are the pentapolymers of vinyl fluoride, vinylidene fluoride, tetrafluoroethylene, vinyl benzoate, and a vinyl ester of an alkane carboxylic acid, particularly vinyl butyrate.

The polymers of the present invention are prepared by polymerizing mixtures of the various monomers in the presence of a free radical initiating system, including peroxy compounds, azo compounds, ultraviolet light, and ionizing radiation, in either inert organic solvents or in aqueous media. Many useful solvents or solvent combinations are known. These include the lower molecular weight, straight-chain saturated fatty acids such as acetic acid, tertiary alcohols such as tertiary-butyl alcohol, saturated aliphatic nitriles such as acetonitrile, chlorofluorocarbons and fluorocarbons such as trichlorotrifluoroethane, perfluorodimethylcyclobutane or perfluorodimethylcyclohexane, and certain inert esters such as 2,2,3,3-tetrafluoropropyl acetate and trimethyl phosphate. The use of these particular solvents allows the preparation of higher molecular weight polymers of more uniform composition under otherwise equivalent conditions than other solvents. Solvent combinations such as trichlorotrifluoroethane with acetonitrile or acetic acid, tertiary-butyl alcohol with acetic acid or water, acetic acid with monochlorodifluoromethane, or tetrafluoropropyl acetate with acetic acid are also effective solvent media for preparing the polymers of the present invention. The amount of solvent used should be sufficient to disperse or dissolve the polymeric product as it is formed. Generally, the weight of solvent should be at least equal the weight of the reactants.

As a general rule, organic peroxides which are soluble in the reaction solvent are used as the free radical initiators. At temperatures below 100° C., acyl peroxides such as dilauroyl peroxide or benzoyl peroxide are useful. However, if an optional olefinically unsaturated acid monomer is used and is a free carboxylic acid such as acrylic or methacrylic acid, peroxy esters such as tertiary-butyl perbenzoate, tertiary-butyl peroxypivalate, or tertiary-butyl peracetate initiators should be used. In general, the polymerization reactions of this invention are carried out at a useful decomposition temperature of the free radical initiator, which is generally between 50° C. and 160° C. For reactions which are particularly difficult to initiate, the use of di-tertiary-alkyl peroxides such as di-tertiary-butyl peroxide at 120° C. to 160° C. is recommended.

Since reaction of the growing molecular chain with the solvent gives low molecular weight brittle polymers (chain transfer), the polymerization reaction should be carried out as a general rule at as low a temperature as possible since this minimizes the tendency of the solvent to enter into the reaction. A second mode of minimizing solvent reaction is by the use of higher pressures which increases the concentration of the more volatile monomers such as tetrafluoroethylene, vinyl fluoride, and vinylidene fluoride in the reaction solvent. Increased amounts of tetrafluoroethylene, vinyl fluoride, or vinylidene fluoride in the reaction solvent increase the probability of chain propagation over chain transfer with the solvent. Polymerization at higher pressures is further advantageous in that the higher pressures enable the polymerization to be carried out at minimum temperatures.

The copolymerization is carried out in a sealed system adapted to withstand the pressures necessitated by the reaction. The necessary pressures may range from 100 p.s.i.g. to 10,000 p.s.i.g. or higher depending on the particular polymer desired and the free radical intiator used. Either batch or continuous systems may be used The materials of construction for the reaction system require no special consideration except that they must be capable of withstanding the temperatures and pressures used. Generally, steel, "Monel," "Inconel," "Hastelloy," or stainless steel are used.

In the batch system, the reactants, solvents, and intiator are added to the pressure vessel and heated usually with agitation until the reaction stops. The order of addition is not critical. However it is preferred to add the liquid components to the vessel first and thereafter add the gaseous components which must be added under pressure. Once initiated many of these polymerizations are exothermic and care should be taken to maintain temperature control. When the reaction is complete any unreacted gaseous monomers are removed or recovered. The liquid reaction mass is then diluted with ethyl alcohol or another such solvent which causes the polymeric product to precipitate completely. The precipitated product is then washed with alcohol and dried. The reaction solvent may be recovered if desired but the alcohol used to precipitate the polymer should be carefully removed from the reaction solvent before reuse since the alcohol would interfere with further polymerizations.

In a continuous process which is preferred the solid and liquid monomers being used and the initiator are dissolved in the reaction solvent. The resulting solution is pumped into an agitated pressurized reaction vessel which is liquid-full of reaction mixture at the desired reaction temperature. At the same time gaseous monomers such as vinylidene fluoride, vinyl fluoride, and tetrafluoroethylene are forced under pressure into the same liquid-full pressurized reaction vessel. The reactants are admitted into the vessel in essentially the same ratio as desired in the final product. The pressure within the vessel is maintained at or above autogenous pressure by a pressure release valve in the exit line which opens when its preset release pressure is reached. Since reactants are continuously pumped into the vessel product is continuously discharged from the system through the pressure release valve. The fluid end product is usually diluted with alcohol or other solvent to completely precipitate the copolymer which is then further treated as in the batch process.

The continuous process is preferred because it produces a more uniform product than the batch process. This is probably due to the fact that a continuous operation makes it possible to maintain more uniform concentrations of reactants in the solvent at all times. In a batch process the concentrations of reactants in the reaction media vary as they are consumed. In operating the continuous process it is especially preferred to use 2,2,3,3-tetrafluoropropyl acetate or trimethyl phosphate as the reaction solvent. Pressures for the continuous process are preferably above autogenous pressure, and more preferably about 800 to 900 p.s.i. The preferred reaction temperature for preparing the majority of polymers of the present invention is from 60° C. to 100° C. Feed rates are adjusted to produce maximum conversion which usually involves average residence times in the reaction vessel of from 1.0 to 3.0 hours under the preferred conditions cited. It is understood, of course, that the preferred conditions outlined above vary with the particular combination of monomers used.

Representative examples illustrating the present invention follow. All parts are by weight unless specified otherwise. Elemental and instrumental analyses were carried out using standard techniques well known in the art. Outdoor exposures and weathering tests were carried out in the usual manner.

Polymer compositions were based on elemental analysis for carbon, hydrogen, fluorine, chlorine, and phosphorus using established analytical methods. Acid content was determined by titration with base, and vinyl aromatic carboxylate content was determined by difference or was based on the infrared spectrum using a correlation between absorption at 14 microns (aromatic ring) and the concentration of vinyl aromatic carboxylates in polymers containing $C^{14}$-tagged vinyl aromatic carboxylate.

Accelerated weathering tests were conducted in an "Atlas Weather-Ometer," Model XW (Atlas Electrical Devices Co., Chicago, Ill.). The test pieces were continuously subjected to light of a carbon arc passed through Corex D glass filters and for 18 minutes out of every 2 hours were also subjected to a spray of distilled water. Both pigmented and clear interpolymer coatings on wood and metal substrates were checked for adhesive failure with pressure-sensitive cellophane tape. The salt-fog machine is an Industrial Corrosion Test Cabinet, Type 411, 1ABC. In this test, an X-cut was made through the surface coatings on the metal articles. The articles were then placed in the cabinet so the coated surfaces were exposed. A humid atmosphere was then generated in the cabinet and the articles subjected to the salt spray (5% sodium chloride in aqueous solution at 95° F.). After the time period for the test, the articles were examined for failure of the coatings at the X-cut.

Melt flow rate in the following examples was determined using ASTM Method D–1238–62T. Flow rate is measured for the purposes of the invention by forcing the melted polymer at a specified temperature through an orifice having a diameter of 0.0825 in. and length of 0.319 in. with a weight of 2160 g. Flow rate can be defined as the weight of molten polymer that passes through the orifice in 10 minutes at the given temperature and at the given extrusion weight.

The "sticking temperature" is a softening temperature which is measured by a determination of the lowest temperatures at which a polymer in contact with the heated brass block leaves a molten trail when moved across the block.

Film or coating hardness was determined by the Pencil Method as illustrated in the following articles by W. T. Smith, Official Digest, 28, 232–7 (1956); H. A. Gardner and G. G. Sward, Paint Testing Manual, 12th ed., Gardner Laboratory, Inc.

EXAMPLE 1

Vinylidene fluoride/tetrafluoroethylene/vinyl benzoate/ bis(2-chloroethyl) vinylphosphonate/itaconic acid pentapolymer A 400 ml. pressure vessel was flushed with nitrogen and charged with 250 ml. of trimethyl phosphate, 2 ml. of vinyl benzoate, 0.5 g. itaconic acid, 0.5 ml. bis(2-chloroethyl) vinylphosphonate, and 0.65 ml. of a 75% solution of tertiary-butyl peroxypivalate in mineral spirits. The vessel was closed, cooled in Dry Ice-acetone, and evacuated. One hundred twenty grams of vinylidene fluoride and 30 g. of tetrafluoroethylene were added. The pressure vessel and its contents were shaken and heated to 60° C. at autogenous pressure (1000 p.s.i.). When the temperature reached 60° C., the temperature was increased to 65° C. over a period of 30 minutes and then was maintained at 65° C. for one hour. The pressure vessel and its contents were cooled to room temperature and, after venting any unreacted gases, the contents were discharged. The reaction mixture was a clear viscous solution. When the reaction mixture was poured into 400 ml. of chloroform, the polymer which precipitated was separated by filtration and then was washed twice in a blender with 300 ml. of chloroform. The polymer was then dried in a vacuum oven at 60° C. to 70° C. to yield 34 g. of solid polymer.

The polymer was shown to contain 0.2% phosphorus and 59.2% fluorine by elemental analysis. These analyses correspond to a 1.5% by weight content of bis(2-chloroethyl) vinylphosphonate-derived groups, i.e., 0.005 mole per mole of vinylidene fluoride. The presence of groupings within the polymer derived from the vinyl benzoate was indicated by absorption in the infrared at 5.8, 6.2, 6.3, 6.7, and 14.1 microns. The concentration of the vinyl benzoate in the polymer was 2.2% by weight or 0.0115 mole per mole of vinylidene fluoride. Itaconic acid-derived groupings were shown to be present in a concentration of 0.2% by weight by a neutral equivalent determination. This amounted to a concentration in the polymer of 0.00115 mole of itaconic acid-derived groups per mole of vinylidene fluoride. Elemental analysis of the polymer showed that 13 parts by weight were from tetrafluoroethylene groups, i.e., 0.10 mole of tetrafluoroethylene per mole of vinylidene fluoride.

A solution containing 15% solids was readily prepared in dioxane and a 13% solids solution was obtained using a mixture of equal volumes of methyl ethyl ketone and cyclohexanone as the solvent. The inherent viscosity of the polymer as a 0.5% solution by weight in dimethylformamide at 30° C. was 0.68. The polymer exhibited some crystallinity and the crystalline melting point was 182° C. Coatings of the polymer on bright aluminum, galvanized and Bonderized steel exhibited excellent adhesion in both dynamic and static wet adhesion tests. Solutions (15% to 20% solids) of the polymer in methyl ethyl ketone/dioxane, in dioxane, in dioxane/cyclohexanone, and in dioxane/4-methyl-4-methoxypentan-2-one were prepared and brush applied to give clear coatings on various woods, including redwood and cedar. Solutions (10% to 12% solids) of the polymer in the same solvents were readily spray applied to wood. These coatings were air dried to give clear, continuous films which exhibited good resistance to weathering tests.

A tetrapolymer containing all the monomers above except vinyl benzoate was prepared using the above procedure, solvent, and initiator. The amounts of the monomers charged were 120 g. vinylidene fluoride, 30 g. tetrafluoroethylene, 0.5 ml. bis(2-chloroethyl) vinylphosphonate, and 0.5 g. itaconic acid. This polymer was soluble in methyl ethyl ketone and the solvents listed above but gave only cloudy, poorly coalesced, weak films which were unsuitable as protective coatings.

EXAMPLE 2

Vinyl fluoride/tetrafluoroethylene/vinyl benzoate/bis(2-chloroethyl) vinylphosphonate/itaconic acid pentapolymer Under a slow sweep of nitrogen, a solution of 0.5 g. of itaconic acid, 2 ml. of vinyl benzoate, 0.75 g. of bis(2-chloroethyl) vinylphosphonate, and 0.65 ml. of a 75% solution of t-butyl peroxypivalate in mineral spirits in 250 ml. of trimethyl phosphate was added to a 400 ml. stainless steel-lined pressure vessel. The vessel was then pressured to 100 p.s.i. with nitrogen and carefully vented to atmospheric pressure. The vessel and its contents were cooled in Dry Ice-acetone, evacuated, nitrogen purged, and re-evacuated. To the vessel were then added 120 g. vinyl fluoride and 30 g. of tetrafluoroethylene. The pressure vessel and its contents were shaken and heated over a period of 30 minutes to 60° C. at which the autogenous pressure was 800 p.s.i. The temperature was then raised to 65° C. over a 30-minute period to give a pressure of 850 p.s.i. After one hour at 65° C. the pressure had dropped to 800 p.s.i., and the reactor was allowed to cool to room temperature.

After venting unreacted gases, the reaction product was discharged as a viscous mass which was poured into methanol. The white polymer was separated by filtration and then was washed in a blender in turn with 300 ml. of a mixture of equal volumes of chloroform and methanol, with 300 ml. of methanol, and finally with 300 ml. of trichlorotrifluoroethane. After drying at 60° C. to 70° C. to constant weight, there was obtained 43 g. of a hard granular polymer.

Analysis indicated that the polymer contained 45.6% fluorine and 0.26% phosphorus. Analysis indicated that the polymer contained 0.9% by weight itaconic acid, i.e., 0.0049 mole per mole of vinyl fluoride. Infrared spectra analysis indicated that the vinyl benzoate content of the polymer was approximately 8.6% by weight or 0.041 mole per mole of vinyl fluoride. The tetrafluoroethylene content was 25% by weight or 0.18 mole per mole of vinyl fluoride. The vinyl fluoride-derived units accounted for 64.4% by weight of the polymer.

As a 0.5% by weight solution in dimethylformamide at 30° C., the polymer exhibited an inherent viscosity of 0.96. The crystalline melting point of the polymer was 184.5° C. Solutions of the polymer were readily prepared in dioxane, mixtures of dioxane and methyl ethyl ketone, nitromethane, and nitroethane.

A harder interpolymer was prepared in the same manner as above from 110 g. vinyl fluoride, 40 g. tetrafluoroethylene, 7 g. vinyl benzoate, 1.1 g. bis(2-chloroethyl) vinylphosphonate and 0.75 g. itaconic acid. This interpolymer yielded good coalesced films at room temperature from a solution in dioxane.

EXAMPLE 3

An interpolymer similar to that described in Example 1 was prepared in a continuous manner in a 1.5-liter autoclave. The reactor was liquid-filled with equal volumes of (1) a solution of 80 g. of vinyl benzoate, 20 g. of itaconic acid, and 10 g. of bis(2-chloroethyl) vinylphosphonate in 2910 ml. of trimethyl phosphonate, and (2) a solution of 14 ml. of a 75% solution of t-butyl peroxypivalate in mineral spirits in 2986 ml. of trimethyl phosphate. The solution was agitated and the temperature was raised to 70° C. A mixture of vinylidene fluoride and tetrafluoroethylene was then introduced under a pressure of 1525 p.s.i.g. at a rate of 420 g./hr. of vinylidene fluoride and 120 g./hr. of tetrafluoroethylene into the reactor. At the same time, solutions (1) and (2) were each pumped into the reactor at a rate of 5 ml. per minute. The pressure within the vessel was maintained at the operating pressure by a pressure release valve in the exit line which opened when its preset release pressure was reached. Thus, the reactants were continuously pumped into the vessel and the product was continuously discharged from the system through the pressure release valve. After about 8 hours of continuous operation, a sample of the product was collected. The conversion to solid polymer was 32%. This solid polymer was isolated by addition of the reaction product, a viscous solution, to an equal volume of a 1/1 by volume mixture of methanol and chloroform. The precipitated polymer was separated by filtration and washed twice with additional portions of the 1/1 methanol/chloroform mixture in a blender. It was then dried to constant weight in a vacuum oven. The polymer contained 58.1% fluorine and exhibited an inherent viscosity of 0.43 as a 0.5% solution in dimethylformamide at 30° C. Analysis indicated that the polymer contained 56% by weight vinylidene fluoride, 32.8% by weight of tetrafluoroethylene, i.e., 0.0378 mole, per mole of vinylidene fluoride, 8.3% by weight of vinyl benzoate, i.e., 0.064 mole, per mole of vinylidene fluoride. The analysis also showed the polymer contained 1.7% itaconic acid or 0.015 mole, per mole of vinylidene fluoride, and 1.2% by weight of bis(2-chloroethyl) vinylphosphonate, i.e., 0.0059 mole, per mole of vinylidene fluoride.

A clear, well-coalesced film of the polymer was cast at room temperature from dioxane solution. The film was highly flexible and showed good resistance to tearing. Attractive adherent coatings of the polymer were also formed on redwood, cedar, and yellow pine.

EXAMPLE 4

Vinylidene fluoride/tetrafluoroethylene/vinyl benzoate/vinyl acetate tetrapolymer A solution of 225 ml. of glacial acetic acid, 15 ml. of t-butanol, 10 ml. of vinyl benzoate, 10 ml. of vinyl acetate, and 0.6 ml. of a 75% solution of t-butyl peroxypivalate in mineral spirits was charged to a 400 ml. stainless steel-lined pressure vessel. The vessel was swept with nitrogen, cooled to −80° C., evacuated, and then charged with 150 g. of vinylidene fluoride and 38 g. of tetrafluoroethylene. With continuous agitation the vessel and its contents were heated to 55° C. for one hour, 57° C. for one hour, 59° C. for one hour, 61° C. for one hour, 63° C. for 1.5 hours, 65° C. for 1.5 hours, 70° C. for 2 hours. During this reaction period, the pressure dropped from 1900 to 850 p.s.i. After cooling to room temperature, the reaction product was discharged and washed thoroughly with 2 liters of methanol. The precipitated polymer was separated by filtration and dried overnight at 60° C. Thirty-seven grams of the white solid polymer was obtained. Elemental analysis indicated that the polymer contained 42.15% fluorine, 43.3% carbon, and 3.0% hydrogen. Analysis showed that the polymer contained 40.6% by weight vinylidene fluoride, 23.9% tetrafluoroethylene, i.e., 0.375 mole, per mole of vinylidene fluoride, 8.3% by weight vinyl benzoate, i.e., 0.116 mole, per mole of vinylidene fluoride, and 24.5% by weight of vinyl acetate, i.e., 0.45 mole, per mole of vinylidene fluoride.

The polymer exhibited a sticking temperature of 102° C. and a glass transition temperature of −18° C. The polymer was soluble in methyl ethyl ketone at room temperature. Films cast from such a solution were clear and showed an elongation of about 200%. A coating of the polymer on a metal substrate was quite hard as was indicated by the fact that it was just slightly marred in the fingernail hardness test.

EXAMPLES 5–11

Vinylidene fluoride/tetrafluoroethylene/vinyl benzoate interpolymers

By the general procedure of Example 4, a number of other polymers were prepared as shown in Table I. All preparations were carried out under autogenous pressure. Each of these polymers was soluble in cyclohexanone and coatings were applied at room temperature to a variety of substrates from the solutions. The coatings were each continuous, well coalesced, and durable. All of the polymers in Table I have inherent viscosities in the range of 0.1 to 3.0 at 0.5% by weight solutions in dimethylformamide at 30° C.

soluble in hot dimethylacetamide and in hot methyl ethyl ketone, yielded a film from these solutions which was extremely brittle, not capable of being drawn, and incompletely coalesced.

TABLE I

[Vinylidene Fluoride/Tetrafluoroethylene/Vinyl Aromatic Carboxylate Interpolymers]

| Ex. No. | Monomers | Grams Charged | Polymerization Conditions ||||| Composition || Interpolymer |||
|---|---|---|---|---|---|---|---|---|---|---|---|
| | | | Initiator | Medium | Temp. (° C.) | Time (hrs.) | Wt. percent | Mole/mole VF$_2$ | Yield (g.) | Hardness [a] | Solubility [b] |
| 5 | Vinylidene fluoride<br>Tetrafluoroethylene<br>Vinyl benzoate<br>Chlorotrifluoroethylene | 140<br>30<br>25<br>20 | t-Butyl perbenzoate, 0.8 ml | Acetic acid, 220 ml | 100–125 | 16 | 27.2<br>33.3<br>27.5<br>12.0 | ----<br>0.375<br>0.116<br>0.23 | 90 | 2B | G |
| 6 | Vinylidene fluoride<br>Tetrafluoroethylene<br>Vinyl benzoate<br>Chlorotrifluoroethylene<br>Itaconic acid | 140<br>35<br>20<br>20<br>0.5 | t-Butyl perbenzoate, 0.6 ml | do | 105–130 | 10 | 44.9<br>24.2<br>18.5<br>12.0<br>0.4 | ----<br>0.31<br>0.162<br>0.13<br>0.004 | 109 | 2B | G |
| 7 | Vinylidene fluoride<br>Tetrafluoroethylene<br>Vinyl benzoate<br>Chlorotrifluoroethylene<br>Itaconic acid | 150<br>35<br>15<br>15<br>0.5 | t-Butyl perbenzoate, 0.5 ml | Acetic acid, 225 ml | 102–125 | 10 | 36.6<br>33.8<br>20.8<br>8.2<br>0.5 | ----<br>0.60<br>0.246<br>0.123<br>0.0067 | 82 | HB | G |
| 8 | Vinylidene fluoride<br>Tetrafluoroethylene<br>Vinyl benzoate<br>Ethylene | 70<br>35<br>15<br>17 | t-Butyl peroxypivalate, 0.9 ml. | t-Butanol/acetic acid, 155/145 ml. | 60–75 | 12 | | | 42 | 3B | G |
| 9 | Vinylidene fluoride<br>Tetrafluoroethylene<br>Vinyl benzoate | 75<br>35<br>15 | ----do---- | t-Butanol/acetic acid, 160/155 ml. | 60–75 | 10 | 22.0<br>44.8<br>33.1 | ----<br>1.32<br>0.65 | 39 | 2B | G |
| 10 | Vinylidene fluoride<br>Tetrafluoroethylene<br>Vinyl 2-chlorobenzoate. | 120<br>20<br>15 | t-Butyl peroxypivalate, 0.6 ml. | 2,2,3,3-tetrafluoropropyl acetate, 300 ml. | 55–68 | 7 | 79.4<br>9.2<br>16.5 | ----<br>0.073<br>0.073 | 51.5 | HB | G |
| 11 | Vinylidene fluoride<br>Trifluoroethylene<br>Tetrafluoroethylene<br>Vinyl benzoate<br>Itaconic acid | 150<br>15<br>35<br>10<br>0.5 | t-Butyl perbenzoate, 0.5 ml. | Acetic acid, 225 ml | 100–130 | 10 | 45.0<br>9.0<br>32.0<br>12.5<br>0.5 | ----<br>----<br>0.41<br>0.10<br>0.005 | 117 | HB | G |

[a] Hardness measured by the pencil hardness test as hereinbefore described.
[b] Solubility in cyclohexanone and/or dimethylacetamide at room temperature: G, good; F, fair; P, poor; I, insoluble. Good, forms clear 10% solution free of gel particles; fair, forms 10% solution which may contain a small amount of gel particles; poor, forms solution in hot solvent, but gel forms when cooled; insoluble, unaffected or only swollen by solvent.

EXAMPLE 12

Vinylidene fluoride/tetrafluoroethylene/isobutylene/vinyl benzoate tetrapolymer

A 400 ml. pressure vessel was flushed with nitrogen and charged with 145 ml. acetic acid, 145 ml. of tertiary-butanol, 1.2 ml. of a 75% solution of tertiary-butyl peroxypivalate in mineral spirits, and 15 g. of vinyl benzoate. The vessel was closed, cooled in Dry Ice-acetone, evcauated, and charged with 70 g. of vinylidene fluoride, 35 g. of tetrafluoroethylene, and 17 g. of isobutylene. The vessel and its contents were shaken and heated to 60° C. While the agitation was maintained, the temperature was slowly increased to 65° C. over a period of one hour and then successively from 65° C. to 70° C. over a period of one hour followed by a 4-hour heating period at 70° C. and an additional 4 hours at 75° C. During this heating period the autogenous pressure fell from 1600 p.s.i. at 60° C. to 375 p.s.i. at 75° C. The pressure vessel and its contents were cooled to room temperature and, after venting any unreacted gases, the contents were discharged. The reaction mixture was poured into ethanol to precipitate the interpolymer. The polymer was thoroughly washed in a blender with ethanol and then was dried in a vacuum oven at 80° C. to yield 36 g. of solid polymer.

The dry polymer was soluble in dimethylacetamide and in toluene. The pencil hardness of a 1.0 mil melt-applied coating on aluminum was HB. A solution of one gram of the interpolymer in 10 ml. of toluene was prepared at room temperature and was cast onto glass to give a clear, tough film. The film was coalesced well at room temperature and, after drying at room temperature, was removed by soaking in water. The unsupported film was brilliantly clear and could be drawn about 20% at room temperature.

In contrast, a terpolymer prepared according to the above procedure from 70 g. of vinylidene fluoride, 35 g. of tetrafluoroethylene, and 17 g. of isobutylene, although

EXAMPLE 13

Vinyl fluoride/tetrafluoroethylene/vinyl benzoate terpolymer

By the same procedure as Example 2, a pressure vessel was charged with 240 ml. of trimethyl phosphate, 10 ml. of vinyl benzoate, 0.5 ml. of a 75% by weight solution of tertiary-butyl peroxypivalate in mineral spirits, 100 g. of vinyl fluoride, and 50 g. of tetrafluoroethylene. With continuous shaking, the reaction mixture was heated to 59° C. and then was slowly increased to 65° C. over a period of 30 minutes. After an additional hour at 65° C., the vessel and its contents were cooled to room temperature and the polymer isolated as before. Thirty-four grams of white, solid polymer were obtained. This polymer contained 50.1% fluorine and was soluble in both N,N-dimethylformamide and methyl ethyl ketone. Analysis revealed that the polymer contained 42.2% by weight of units derived from vinyl fluoride, 39.4% by weight of units derived from tetrafluoroethylene, i.e., 0.39 mole, per mole of vinyl fluoride, and 13.9% by weight of units derived from vinyl benzoate, i.e., 0.102 mole, per mole of vinyl fluoride.

The polymer had an inherent viscosity of 1.25 at 30° C. as a 0.5% by weight solution in N,N-dimethylformamide. A film of the polymer formed from a 10% solution in methyl ethyl ketone cast on aluminum showed very good coalescibility at room temperature.

In another experiment using the same procedure, a mixture of 150 g. of vinyl fluoride, 50 g. of tetrafluoroethylene, and 15 g. of vinyl benzoate was polymerized in 200 ml. of 2,2,3,3-tetrafluoropropyl acetate using 0.7 g. of dilauroyl peroxide as the initiator, at 60° C. to 90° C. over a period of 16 hours. The yield of polymer was 70 g. It was readily soluble in dioxane and in cyclohexanone to give 10% solids solutions from which were cast to form bright, clear, crinkly films which coalesced well at room temperature.

When the above procedure is repeated except that equivalent amounts of vinyl naphthoate is substituted for vinyl benzoate, a polymer possessing similar properties is prepared.

EXAMPLES 14-20

Using the same procedure as the previous examples, a series of other interpolymers containing vinyl fluoride, tetrafluoroethylene, and a vinyl aromatic carboxylate were prepared as listed in Table II. All preparations were carried out under autogenous pressure. All of the polymers in Table II have inherent viscosities in the range of 0.1 to 3.0 as 0.5% by weight solutions in dimethylformamide at 30° C.

of trimethyl phosphate per hour. Distilled vinyl fluoride was fed through the third liquid feed pump at a rate of 225 g./hr. A mixture of vinyl fluoride and tetrafluoroethylene, each of which was first passed through a silica gel scrubber, was fed as a gas through the compressor such that the feed rate of vinyl fluoride was 50 g./hr. and tetrafluoroethylene 100 g./hr. (total vinyl fluoride feed 275 g./hr.). The operating pressure of the vessel was 800 to 825 p.s.i. and the reactor was maintained at 65° C. Initially, the pressure reactor was filled two-thirds with trimethyl phosphate and one-third with an equal mix of the two solvent solutions. The total time of the run was 7 hours and the material collected after 3 hours of operation until the end of the operation was taken as product. The interpolymer was precipitated by pouring the product solution into cold methyl alcohol. The resulting

TABLE II

[Vinyl Fluoride/Tetrafluoroethylene/Vinyl Aromatic Carboxylate Interpolymers]

| Ex. No. | Monomers | Grams Charged | Polymerization Conditions | | | | Composition | | Interpolymer | | |
|---|---|---|---|---|---|---|---|---|---|---|---|
| | | | Initiator | Medium | Temp. (°C.) | Time (hrs.) | Wt. per- cent | Mole/ mole VF | Yield (g.) | Hard- ness[a] | Sol- ubil- ity[b] |
| 14 | Vinyl fluoride<br>Tetrafluoroethylene<br>Vinyl 4-(t-butyl)- benzoate. | 110<br>40<br>15 | t-Butyl peroxypivalate, 0.4 ml. | Trimethylphos- phate, 250 ml. | 55-65 | 8 | 46.3<br>39.4<br>14.3 | ----<br>0.39<br>0.07 | 79 | 2B | G |
| 15 | Vinyl fluoride<br>Tetrafluoroethylene<br>Vinyl 5-chloro-2- hydroxybenzoate. | 120<br>30<br>20 | t-Butyl peroxypivalate, 0.75 ml. | ---- do ---- | 60-70 | 6 | 46.0<br>33.3<br>20.7 | ----<br>0.33<br>0.10 | 31 | B | G |
| 16 | Vinyl fluoride<br>Tetrafluoroethylene<br>Vinyl benzoate<br>Bis(2-chloroethyl) vinylphos- phonate. | 100<br>50<br>1<br>1 | t-Butyl peroxypivalate, 0.4 ml. | Trimethylphos- phate, 245 ml. | 60-66 | 1.5 | 41.1<br>50.3<br>6.5<br>2.1 | ----<br>0.56<br>0.049<br>0.010 | 61 | B | G |
| 17 | Vinyl fluoride<br>Tetrafluoroethylene<br>Vinyl benzoate<br>Itaconic acid | 100<br>50<br>5<br>1 | ---- do ---- | ---- do ---- | 60-66 | 1.5 | 34.8<br>52.2<br>11.6<br>1.4 | ----<br>0.68<br>0.10<br>0.014 | 45 | B | G |
| 18 | Vinyl fluoride<br>Tetrafluoroethylene<br>Chlorotrifluoro- ethylene.<br>Vinyl benzoate | 50<br>30<br>30<br>20 | t-Butyl peroxybenzoate, 0.9 ml. | t-Butanol/ acetic acid, 150/150 ml. | 60-75 | 11 | 28.6<br>23.4<br>24.0<br>24.0 | ----<br>0.37<br>0.34<br>0.26 | 57 | F | (c) |
| 19 | Vinyl fluoride<br>Tetrafluoroethylene<br>Vinyl benzoate<br>Cetyl vinyl ether | 120<br>40<br>10.7<br>5.3 | t-Butyl peroxypivalate 0.45 ml. | t-Butanol/trim- methylphosphate, 140/140 ml. | 55-68 | 6 | | | 45 | 3B | G |
| 20 | Vinyl fluoride<br>Tetrafluoroethylene<br>Vinyl benzoate<br>Acrylic acid | 100<br>40<br>10.7<br>2 | ---- do ---- | Trimethylphos- phate 280 ml. | 55-66 | 6 | 37.0<br>43.0<br>13.6<br>6.5 | ----<br>0.54<br>0.115<br>0.112 | 54 | B | G |

[a] and [b] See footnotes, Table I.
[c] G in DMF and DMAC.

EXAMPLE 21

Vinyl fluoride/tetrafluoroethylene/vinyl benzoate/vinyl/ ester of a $C_{10}$ saturated tertiary alkane carboxylic acid/ dimethyl-vinylphosphonate/bis(2 - chloroethyl) vinylphosphonate/itaconic acid-continuous polymerization The interpolymer preparation was carried out in a 1.5 liter pressure vessel equipped with an agitator. The pressure vessel was connected to 3 pumps for feeding liquids under pressure and to 1 compressor for feeding gases to the vessel. The pressure within the vessel was maintained at or above autogenous pressure by a pressure release valve in the exit line which opened when its preset release pressure was reached. Thus, in this system reactants were continuously pumped into the vessel and product was continuously discharged from the system through the pressure release valve. The reaction vessel was operated liquid-full. Through the first liquid feed pump was fed a solution of the initiator, a 75% solution of t-butyl peroxypivalate in mineral spirits, in trimethylphosphate at the rate of 1.8 ml. of the initiator in 298.2 ml. of the phosphate per hour. Through the second liquid feed pump was fed a solution of 1.6 g. of itaconic acid, 0.6 ml. of dimethyl vinylphosphonate, 0.6 ml. of bis(2-chloroethyl) vinylphosphonate, 25 ml. of vinyl benzoate, 12.5 ml. of the vinyl ester of a $C_{10}$ saturated tertiary alkane carboxylic acid (VV-10 Vinyl Monomer, Shell Chemical Company), and 260 ml.

cake of interpolymer was then progressively washed in a blender with 50/50 water/methanol, pure methanol and, finally, with a second wash of methanol. After drying to constant weight the interpolymer was shown to contain 44.6% fluorine and to possess an inherent viscosity in N,N-dimethylformamide at 30° C. in a concentration of 0.5% by weight of 0.73. The product was formed at a conversion of approximately 20%.

The interpolymer was soluble in dioxane and in nitroparaffins such as nitroethane. Clear, coalesced coatings of the polymer were laid down at room temperature on aluminum from solutions in dioxane. A pigmented coating composition was prepared from 1.8 g. of the polymer, 4.0 g. of toluene, 4.0 g. of nitroethane, and 1.0 g. of pigment grade titanium dioxide. After milling, this pigmented composition was applied to aluminum by both brush and spray techniques. The coating composition was also brush-applied to yellow pine and to redwood. Each sample of wood was given three coats. A sample of the clear polymer was also brush-applied to wood. After air drying, these coated wood samples were subjected to exposure in the "Atlas Weather-Ometer." After 3,500 hours of such exposure, no adhesive failure was shown by either the clear or the pigmented coatings and the pigmented coatings showed no loss in gloss or evidence of chalking. Bright aluminum panels coated with the clear polymer and subjected to the conditions of the salt-fog machine showed no corrosion after 1950 hours.

EXAMPLE 22

Vinyl fluoride/vinylidene fluoride/tetrafluoroethylene/vinyl benzoate tetrapolymer Following the same procedure described in Example 1, a 400-ml. pressure vessel was charged with 225 ml. of acetic acid, 15 ml. of vinyl benzoate, 0.4 ml. of tertiary-butyl perbenzoate, 70 g. of vinyl fluoride, 70 g. of vinylidene fluoride, and 35 g. of tetrafluoroethylene. With continuous agitation, the vessel and its contents were heated at 95° C. to 100° C. for 2 hours, 100° C. to 102° C. for 3 hours, 102° C. to 104° C. for 2 hours, and successively for 2-hour intervals at 106° C., 108° C., 110° C., and 115° C. The reaction mixture was then cooled to room temperature, vented, and the product was discharged. After precipitation in ethanol and thorough washing in a blender with ethanol, 100 g. of white solid polymer was obtained after drying in a vacuum oven.

Elemental analysis revealed that the polymer contained 28% vinyl fluoride and 29% vinylidene fluoride. Based on one mole of the mixture of vinyl fluoride and vinylidene fluoride, the results showed that the polymer contained 0.265 mole of tetrafluoroethylene (28%) and 0.095 mole of vinyl benzoate.

The polymer was soluble in methyl ethyl ketone and in dimethylacetamide. Films cast from either of these solvents were bright, clear, continuous, and well coalesced after drying at room temperature. The dried polymer exhibited a melt flow rate of 14.1 g. per 10 minutes at 190° C. with a load of 2160 g. and an orifice size of 0.082 inch diameter and 0.319 inch length. A 1-mil coating of the polymer on aluminum had a pencil hardness of B.

When the above procedure is repeated except that an equivalent amount of vinyl naphthoate is substituted for the vinyl benzoate, a polymer containing a similar balance of properties is obtained.

EXAMPLES 23–29

A series of other polymers containing vinyl fluoride, vinylidene fluoride, tetrafluoroethylene, and a vinyl aromatic carboxylate were prepared in the same manner as above and are tabulated in Table III below. All preparations were carried out under autogenous pressure. All of the polymers in Table III have inherent viscosities in the range of 0.1 to 3.0 as 0.5% by weight solutions in dimethylformamide at 30° C.

TABLE III

[Vinyl Fluoride/Vinylidene Fluoride/Tetrafluoroethylene/Vinyl Aromatic Carboxylate Interpolymers]

| Ex. No. | Monomers | Grams Charged | Initiator | Medium | Temp. (° C.) | Time (hrs.) | Wt. percent | Mole/mole VF$_2$ | Yield (g.) | Hardness a | Solubility b |
|---|---|---|---|---|---|---|---|---|---|---|---|
| 23 | Vinyl fluoride<br>Vinylidene fluoride<br>Tetrafluoroethylene<br>Vinyl benzoate | 70<br>70<br>35<br>6 | t-Butyl peroxypivalate, 0.9 ml. | t-Butanol/acetic acid, 125/125 ml. | 60–75 | 10 | 33.0<br>30.0<br>30.0<br>7.0 | <br><br>0.250<br>0.059 | 89 | 2B | G |
| 24 | Vinyl fluoride<br>Vinylidene fluoride<br>Tetrafluoroethylene<br>Vinyl benzoate | 70<br>70<br>35<br>30 | ----do---- | ----do---- | 60–75 | 13 | 18.0<br>20.0<br>27.0<br>35.0 | <br><br>0.385<br>0.340 | 57 | B | G |
| 25 | Vinyl fluoride<br>Vinylidene fluoride<br>Tetrafluoroethylene<br>Vinyl 2,4-dichlorobenzoate. | 60<br>60<br>30<br>10 | t-Butyl peroxypivalate, 0.5 ml. | Acetic acid 290 ml. | 50–75 | 14 | | | 62 | B | G |
| 26 | Vinyl fluoride<br>Vinylidene fluoride<br>Tetrafluoroethylene<br>Vinyl benzoate | 40<br>80<br>20<br>20 | t-Butyl peroxypivalate, 1.2 ml. | Acetic acid, 295 ml. | 45–70 | 15 | 21.0<br>21.0<br>23.0<br>35.0 | <br><br>0.29<br>0.31 | 45 | F | G |
| 27 | Vinyl fluoride<br>Vinylidene fluoride<br>Tetrafluoroethylene<br>Chlorotrifluoroethylene.<br>Vinyl benzoate | 50<br>100<br>35<br>15<br>10 | t-Butyl perbenzoate, 0.6 ml. | Acetic acid, 210 ml. | 100–120 | 11 | 14.0<br>39.0<br>21.0<br>11.5<br>14.3 | <br><br>0.23<br>0.11<br>0.11 | 118 | F | G |
| 28 | Vinyl fluoride<br>Vinylidene fluoride<br>Tetrafluoroethylene<br>Vinyl benzoate<br>Dibutyl maleate | 60<br>60<br>30<br>10<br>10 | t-Butyl peroxypivalate, 0.75 ml. | Acetic acid, 270 ml. | 60–75 | 11 | 20.0<br>34.5<br>18.0<br>15.0<br>12.6 | <br><br>0.185<br>0.10<br>0.06 | 57 | HB | G |
| 29 | Vinyl fluoride<br>Vinylidene fluoride<br>Tetrafluoroethylene<br>Vinyl benzoate<br>Itaconic acid | 80<br>80<br>20<br>20<br>3 | t-Butyl perbenzoate, 0.5 ml. | Acetic acid, 225 ml. | 100–120 | 16 | 34.0<br>31.0<br>14.0<br>20.0<br>0.9 | <br><br>0.11<br>0.11<br>0.006 | 77.5 | B | G | a and b See Footnotes, Table I.

EXAMPLE 30

The invention polymers were readily pigmented and showed good pigment wetting properties. A general procedure for preparing pigmented compositions was as follows: To 80 ml. of the selected solvent was added 25 g. of polymer. After solution was obtained, it was occasionally necessary to add additional solvent to obtain a viscosity suitable for the milling operation. Two pigment formulations were used. Formulation A Standard Green—12.5 g. pigment grade titanium dioxide, 2.0 g. Monastral Green B (Colour Index No. 10006), 0.5 g. Columbian Carbon Lampblack No. 11. Formulation B Standard White—15 g. pigment grade titanium dioxide. Depending on whether a green or a white pigmented composition was desired, Formulation A or Formulation B was added to the polymer solution described above and the mixture was rolled for 7 days in a 16 oz. jar with 100 ceramic 0.5 inch diameter mill balls. The resulting dispersion was then strained through a coarse wire mesh to separate the balls and stirred in the usual fashion before use. It was applied by brush in a normal manner or by spray techniques. Each of the invention polymers gave a dried pigmented finish which exhibited medium to high gloss.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A normally solid addition interpolymer comprising in copolymerized form
    (A) a hydrofluorovinyl monomer selected from the group consisting of vinyl fluoride, vinylidene fluoride, and mixtures thereof,
    (B) from about 0.05 to about 1.5 moles, per mole of hydrofluorovinyl monomer, of tetrafluoroethylene, and
    (C) from about 0.01 to about 0.7 mole, per mole of hydrofluorovinyl monomer, of at least 1 monovinyl ester of an aromatic carboxylic acid wherein the aromatic nucleus is derived from benzene and naphthalene and contains from 6 to 16 carbon atoms;
said interpolymer having an inherent viscosity of from 0.1 to 3.0 as a 0.5% by weight solution in dimethylformamide at 30° C.

2. The interpolymer of claim 1 where, in addition to components (A), (B), and (C), at least one polymerizable mono-unsaturated monomer is present, said monomer being selected from the group consisting of
    (a) $C_2$ to $C_3$ halohydrocarbon olefins other than vinyl fluoride, vinylidene fluoride, and tetrafluoroethylene,
    (b) vinyl esters of 2 to 18 carbon alkane carboxylic acids,
    (c) $C_2$ to $C_8$ hydrocarbon olefins containing the group $C_2=C<$, and
    (c) alkyl vinyl ethers, said alkyl being of 1 to 16 carbon atoms;
said additional monomer content in the polymer being present in amounts from about 0.05 to about 0.7 mole, per mole of hydrofluorovinyl monomer.

3. The interpolymer of claim 1 where, in addition to components (A), (B), and (C), at least one polymerizable monoolefinically unsaturated acid monomer is present, said monomer being selected from the group consisting of
    (1) the mono- and dicarboxylic acids of from 3 to 18 carbon atoms,
    (2) the mono- and diesters, haloesters, salts, and anhydrides of such carboxylic acids,
    (3) the phosphonic acids of from 3 to 18 carbon atoms, and
    (4) the mono- and diesters, haloesters, salts, and anhydrides of such phosphonic acids;
said additional monomer content in the polymer being from about 0.001 to about 0.1 mole, per mole of hydrofluorovinyl monomer.

4. The interpolymer of claim 1 where, in addition to components (A), (B), and (C),
    (1) at least one polymerizable mono-unsaturated monomer is present, said monomer being selected from the group consisting of
        (a) $C_2$ to $C_3$ halohydrocarbon olefins other than vinyl fluoride, vinylidene fluoride, and tetrafluoroethylene,
        (b) vinyl esters of 2 to 18 carbon alkane carboxylic acids,
        (c) $C_2$ to $C_8$ hydrocarbon olefins containing the group $CH_2=C<$, and
        (d) alkyl vinyl esters, said alkyl being of 1 to 16 carbon atoms, and
    (2) at least one polymerizable monoolefinically unsaturated acid is present, said monomer being selected from the group consisting of
        (a) the mono- and dicarboxylic acids of from 3 to 18 carbon atoms,
        (b) the mono- and diesters, haloesters, salts, and anhydrides of such carboxylic acids,
        (c) the phosphonic acids of from 3 to 18 carbon atoms, and
        (d) the mono- and diesters, haloesters, salts, and anhydrides of such phosphonic acids,
said polymerizable mono-unsaturated monomer (1) being present in the polymer in an amount from about 0.05 to about 0.7 mole, per mole of hydrofluorovinyl monomer, and said polymerizable monoolefinically unsaturated acid monomer (2) being present in the polymer in an amount from about 0.001 mole to about 0.1 mole, per mole of hydrofluorovinyl monomer.

5. The interpolymer of claim 1 wherein said interpolymer has an inherent viscosity of 0.2 to 1.0 in a 0.5% by weight solution of dimethylformamide at 30° C. and has a solubility of at least 10% by weight in dimethylacetamide.

6. The interpolymer of claim 2 wherein said interpolymer has an inherent viscosity of 0.2 to 1.0 in a 0.5% by weight solution of dimethylformamide at 30° C. and has a solubility of at least 10% by weight in dimethylacetamide.

7. The interpolymer of claim 3 wherein said interpolymer has an inherent viscosity of 0.2 to 1.0 in a 0.5% by weight solution of dimethylformamide at 30° C. and has a solubility of at least 10% by weight in dimethylacetamide.

8. The interpolymer of claim 1 wherein the hydrofluorovinyl monomer is vinyl fluoride and the vinyl aromatic carboxylate is vinyl benzoate.

9. The interpolymer of claim 1 wherein the hydrofluorovinyl monomer is vinylidene fluoride and the vinyl aromatic carboxylate is vinyl benzoate.

10. The interpolymer of claim 1 wherein the hydrofluorovinyl monomer is a mixture of vinylidene fluoride and vinyl fluoride and the vinyl aromatic carboxylate is vinyl benzoate.

11. The interpolymer of claim 2 wherein the hydrofluorovinyl monomer is vinyl fluoride, the vinyl aromatic carboxylate is vinyl benzoate, and the polymerizable mono-unsaturated monomer is a vinyl ester of a $C_2$ to $C_{18}$ carboxylic acid.

12. The interpolymer of claim 3 wherein the hydrofluorovinyl monomer is a mixture of vinyl fluoride and vinylidene fluoride, the vinyl aromatic carboxylate is vinyl benzoate, and the ethylenically unsaturated polymerizable acid is itaconic acid.

13. The interpolymer of claim 3 wherein the hydrofluorovinyl monomer is vinyl fluoride, the vinyl aromatic carboxylate is vinyl benzoate, and the ethylenically unsaturated polymerizable acid is itaconic acid.

14. The interpolymer of claim 1 wherein the interpolymer is pigmented.

15. The interpolymer of claim 2 wherein the interpolymer is pigmented.

16. The interpolymer of claim 3 wherein the interpolymer is pigmented.

17. An article of manufacture comprising a structural surface having thereon a coating prepared from an interpolymer of claim 1.

18. An article of manufacture comprising a structural surface having thereon a coating prepared from an interpolymer of claim 2.

19. An article of manufacture comprising a structural surface having thereon a coating prepared from an interpolymer of claim 3.

20. The interpolymer of claim 2 wherein the vinyl ester is vinyl butyrate.

21. A process for preparing fluorine-containing addition interpolymers comprising
    (A) contacting in an inert reaction medium
        (1) a hydrofluorovinyl monomer selected from the group consisting of vinyl fluoride, vinylidene fluoride and mixtures thereof,
        (2) from about 0.05 to about 1.5 moles, per mole of hydrofluorovinyl monomer, of tetrafluoroethylene, (3) from about 0.01 to about 0.7 mole, per mole of hydrofluorovinyl monomer, of at least one monovinyl ester of an aromatic carboxylic acid wherein the aromatic nucleus is derived from benzene and naphthalene, and
(4) a free radical generating initiator;
(B) heating the reaction mixture to a temperature of 50° C to 160° C. while maintaining the reaction mixture under a pressure of from about 100 p.s.i.g. to 10,000 p.s.i.g., and
(C) thereafter obtaining from the reaction mixture interpolymers containing the hydrofluorovinyl monomer, tetrafluoroethylene, and said monovinyl ester of an aromatic carboxylic acid.

No references cited.

JOSEPH L. SCHOFER, *Primary Examiner.*

J. KIGHT III, *Assistant Examiner.*

U.S. Cl. X.R.

117—148, 155, 161; 260—80.8, 80.76, 80.77, 80.81, 87.1, 87.5, 87.7